(12) United States Patent
Rinne et al.

(10) Patent No.: US 6,928,299 B1
(45) Date of Patent: Aug. 9, 2005

(54) METHOD FOR TRANSMITTING USER IDENTIFICATION DATA TO A WIRELESS COMMUNICATION DEVICE

(75) Inventors: Juha Rinne, Tampere (FI); Ilkka Ratamo, Haan (DE)

(73) Assignee: Nokia Mobile Phones Ltd., Espoo (FI)

(*) Notice: Subject to any disclaimer, the term of this patent is extended or adjusted under 35 U.S.C. 154(b) by 249 days.

(21) Appl. No.: 09/630,945

(22) Filed: Aug. 3, 2000

(30) Foreign Application Priority Data

Aug. 6, 1999 (FI) .................................. 19991684

(51) Int. Cl.$^7$ ............................................. H04B 1/38
(52) U.S. Cl. .................. 455/555; 455/556.1; 455/557; 455/41.2
(58) Field of Search .................... 455/41, 403, 406, 455/556, 558, 411, 41.2, 41.3, 555, 556.1, 455/557; 235/380; 368/10

(56) References Cited

U.S. PATENT DOCUMENTS

| | | | |
|---|---|---|---|
| 4,903,322 A * | 2/1990 | Inahara et al. .............. 455/514 |
| 4,907,264 A * | 3/1990 | Seiler et al. ................. 379/354 |
| 5,553,314 A | 9/1996 | Grube et al. ............... 455/54.2 |
| 5,664,228 A * | 9/1997 | Mital .......................... 235/380 |
| 5,668,875 A | 9/1997 | Brown et al. ................. 380/23 |
| 5,915,226 A * | 6/1999 | Martineau ................. 379/114.2 |
| 5,943,624 A * | 8/1999 | Fox et al. .................... 455/406 |
| 6,012,634 A * | 1/2000 | Brogan et al. .............. 235/380 |
| 6,118,986 A * | 9/2000 | Harris et al. ................ 235/441 |
| 6,224,254 B1 * | 5/2001 | Hayek et al. ................ 368/281 |
| 6,295,448 B1 * | 9/2001 | Hayes et al. ............. 340/825.72 |
| 6,335,906 B1 * | 1/2002 | Engelmann .................. 340/5.2 |
| 6,370,374 B1 * | 4/2002 | Eichinger et al. ........... 455/411 |
| 6,397,080 B1 * | 5/2002 | Viktorsson et al. ......... 455/556 |
| 2002/0016740 A1 * | 2/2002 | Ogasawara ................... 705/26 |

FOREIGN PATENT DOCUMENTS

| | | |
|---|---|---|
| EP | 0586081 B1 | 4/1998 |
| WO | WO 96/27270 | 9/1996 |
| WO | WO 98/58509 | 12/1998 |
| WO | WO 98/58510 | 12/1998 |

* cited by examiner

*Primary Examiner*—Nick Corsaro
*Assistant Examiner*—Tan Trinh
(74) *Attorney, Agent, or Firm*—Perman & Green, LLP

(57) ABSTRACT

In a method for transmitting user identification data to a wireless communication device (1), user data is stored in a user data identification module (2). Upon initiating operation of the wireless communication device, the user data is examined to obtain access rights of the user of the wireless communication device. The user data is transmitted at least partly in a wireless manner from the user data identification module to the wireless communication device. The invention relates also to a user identification module having means (9) for storing user data and means (4, 6) for transmission of user data to a wireless communication device, and relates also to be wireless communication device (1). The wireless communication device includes means (5) for receiving user data and means (11) for examining the user data to obtain the access rights of the user of the wireless communication device. The data transmitting means (4) includes wireless communication means.

16 Claims, 3 Drawing Sheets

METHOD FOR TRANSMITTING USER IDENTIFICATION DATA TO A WIRELESS COMMUNICATION DEVICE

FIELD OF THE INVENTION

The present invention relates to a method for transmitting user identification data to a wireless communication device, in which method said user data are stored in a user data identification module, wherein in connection with starting up of the wireless communication device, the user data stored in said user data identification module are examined, to find out the access rights of the user of the wireless communication device. The invention also relates to a user data identification module which comprises means for storing user data and means for transmission of user data to a wireless communication device, the wireless communication device comprising means for receiving user data and means for examining the user data to find out the access rights of the user of the wireless communication device. Furthermore, the invention relates to a wireless communication device which comprises means for receiving user data stored in a user data identification module and means for examining the user data to find out the access rights of the user of the wireless communication device.

BACKGROUND OF THE INVENTION

The use of some electronic devices requires the identification of the user before the functions of the electronic device are activated. For example in mobile stations, such as GSM mobile stations and UMTS mobile stations, a so-called SIM card (Subscriber Identity Module) is used, which is placed in a connector set for this purpose in the mobile station. This SIM card is typically arranged in a card format, and it has the necessary connector pins for supplying the operating voltage to the SIM card as well as for transferring information between the SIM card and the mobile station. This SIM card contains stored user identification data, such as an international mobile subscriber identifier (IMSI), a personal identity number (PIN) and a personal unlocking key (PUK). Furthermore, the SIM card may contain a stored telephone number e.g. for addressing the debiting of calls to the correct user. Part of these identification data are stored in the memory means of the SIM card in such a way that the user cannot modify them. On the other hand, the personal identity number, i.e. the PIN code, is arranged to be changeable by the user. In mobile stations of prior art, this card containing the SIM card must be connected to the mobile station before the mobile station can be used for calls. In some cases, it is only possible to call emergency numbers without the SIM card. In addition that the SIM card is connected to the mobile station, the user must select his/her personal identity number with the keypad of the mobile station, after which the mobile station operates normally, presupposing that the PIN code was selected correctly.

In mobile stations of prior art, this connector for the SIM card is arranged inside the mobile station or in a separate reading device, wherein the SIM card is placed in this reading device and the reading device is connected via a cable to the mobile station. In such mobile stations in which the connector of the SIM card is arranged inside the mobile station, the connector is typically placed in such a way that the insertion and removal of the SIM card requires that the battery is removed from the mobile station. However, the user may have several mobile stations which he/she wishes to use even simultaneously. Consequently, the use of different mobile stations requires even the purchase of several SIM cards and simultaneously also the purchase of several mobile subscriptions, or the change of the SIM card to the mobile station which the user wishes to use each time. It is often not reasonable to purchase several SIM cards e.g. for the reason that the user must then pay maintenance and other costs for several mobile subscriptions. Moreover, it is also difficult to change the SIM card from one mobile station to another mobile station, because the mobile stations must then be closed and the battery must be removed before the SIM card can be removed from one mobile stations and be transferred to the other mobile station. Furthermore, this alternative does not make it possible to use the mobile stations simultaneously.

SIM cards presently in use are arranged to be such that they can be used either as cards of credit-card size or as cards with a considerably smaller size, approximately 1.5 $cm^2$. In this case, also the SIM card connector of the mobile station is arranged to be suitable for connecting either a card of credit-card size or said smaller card. A problem with particularly the SIM card of credit-card size but also with the smaller SIM card is that it sets restrictions on reducing the size of the mobile station. On the other hand, it is a drawback with the smaller SIM card size that the handling of such a SIM card is difficult, and it may be easily lost.

One drawback in the external SIM card connection of prior art is that it requires the arrangement of a wiring between the SIM card reading device and the mobile station. Also this solution is not suitable in situations in which the user would like to use two or more mobile stations simultaneously. Furthermore, the user should in each mobile station have means for connecting an external SIM card reading device to the mobile station.

SUMMARY OF THE INVENTION

It is an aim of the present invention to provide a method and device for transmitting user identification data to the wireless communication device. The invention is based on the idea that a wireless data transmission connection is arranged between an identification module and the wireless communication device, wherein this wireless data transmission connection is used to transmit information required in identifying the user. The method according to the present invention is characterized in that the user identification are transmitted at least partly in a wireless manner from the user data identification module to the wireless communication device. The user data identification module according to the present invention is characterized in that said means for transmitting user data comprise wireless communication means. The wireless communication device according to the present invention is characterized in that said means for receiving user data comprise wireless communication means.

The present invention has considerable advantages to methods and devices of prior art. By using a wireless data transmission connection between an identification module and a wireless communication device, the identification module and the connecting means required for its connection can be arranged as a separate unit, wherein it does not necessarily need to be located inside the wireless communication device. Thus, the size of the wireless communication device can be reduced. Furthermore, this arrangement makes it possible that more than one wireless communication device can simultaneously read the user identification data from the identification module, wherein the user can use these different wireless communication devices even simultaneously. With the arrangement according to the invention, it is also possible to avoid difficult transfer of the identification module from one wireless communication device to another wireless communication device. Thus, the user can easily take another wireless communication device into his/her use.

Furthermore, by the arrangement according to the invention, it is also possible to prevent unauthorized use of a wireless communication device e.g. in situations in which the wireless communication device is stolen. Thus, the wireless communication device cannot be used, if the identification module is not with the operating range of the local link used for transmitting identification data between the wireless communication device and the identification module.

In an advantageous embodiment of the invention, the identification module is arranged to be worn on the wrist. This gives the advantage that the user does not need to worry about carrying the identification module, but it is sufficient that this wrist unit is on the user's wrist. Thus, this wrist unit can also be used as a key, wherein in connection with locking of doors, the user is identified from this wrist unit and the door can be opened if the user has sufficient rights of passage. Furthermore, this wrist unit suits particularly well to be used in systems for surveillance of working hours. The identification module can also be arranged in connection with a wrist watch. Moreover, the identification module or wrist piece can comprise so-called intelligent card functions, e.g. charging and discharging of electronic money, a ticket function, etc.

BRIEF DESCRIPTION OF THE DRAWINGS

In the following, the invention will be described in more detail with reference to the appended drawings, in which.

In the following, the invention will be described by using as an example of the wireless communication device 1 a mobile station ME, such as a GSM mobile station or a UMTS mobile station, but it is obvious that the invention can also be applied in connection with other wireless communication devices in which user identification is applied. As an example of a user data identification module 2, a SIM card is used, but the invention is not limited to the case of SIM card only.

Figure 1:
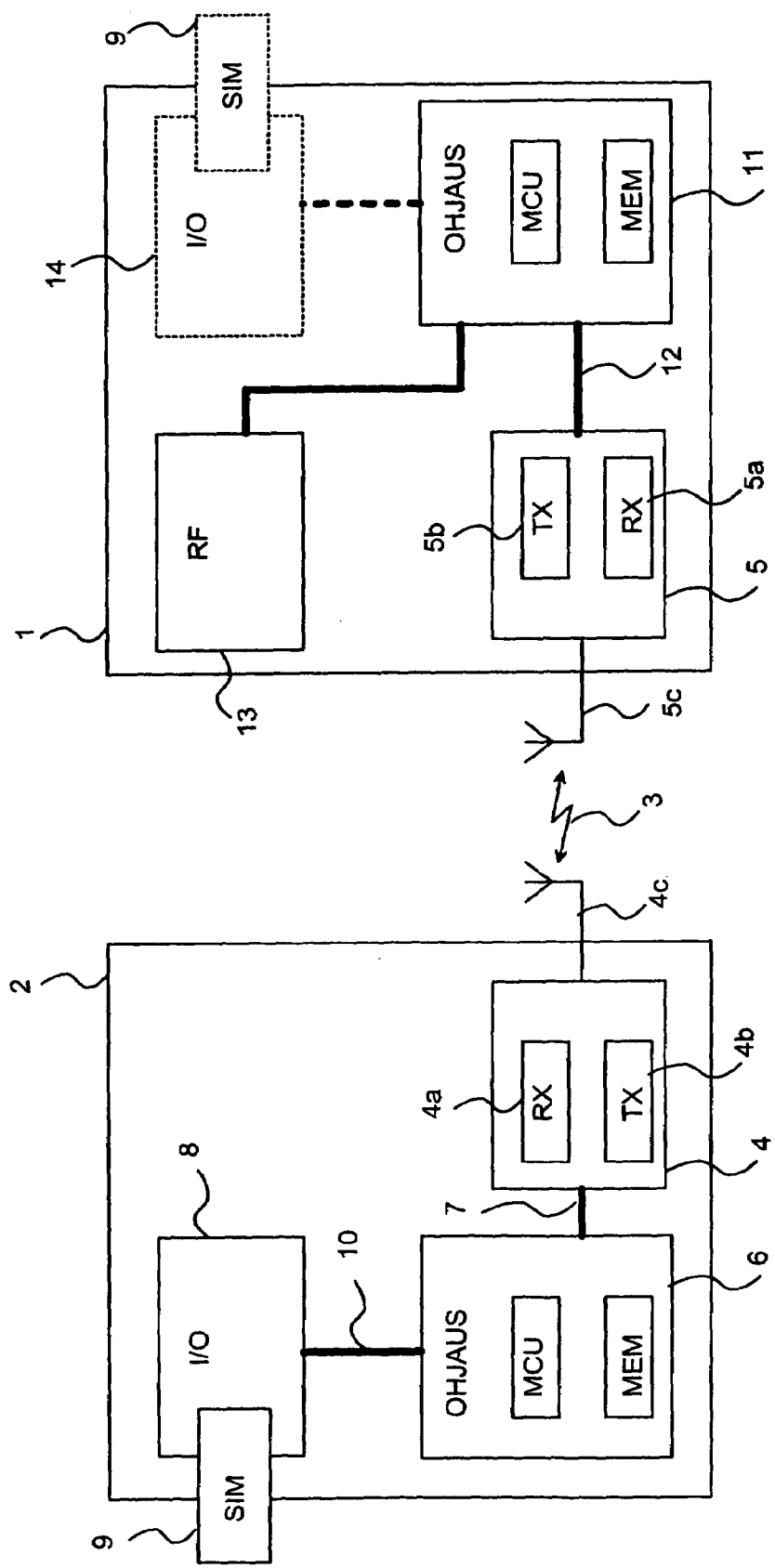
FIG. 1 shows the arrangement according to a first embodiment of the invention for transmitting user identification data to a wireless communication device.

FIG. 1 shows an arrangement according to a first preferred embodiment of the invention, which comprises a wireless communication device 1 and a separate user data identification device 2. Communication between the wireless communication device 1 and the user data identification device 2 is arranged via a wireless local area link 3. This wireless local area link 3 is preferably arranged as a low power radio frequency (LPRF) data transmission connection (e.g. Bluetooth technology), but it is also possible to apply other known methods, such as infrared data transmission. The user data identification device 2 comprises communication means 4 which comprise a transmitter (TX) and a receiver (RX) for setting up a data transmission connection to the wireless communication device 1. Thus, the wireless communication device 1 is provided with corresponding communication means 5 which comprise a transmitter and a receiver. The user data identification device 2 comprises a control unit 6 for controlling the functions of the user data identification device 2. This control unit comprises preferably a processor or the like, such as a microcontroller unit (MCU). The control unit 6 is connected via a first control and data bus 7 to the communication means 4. The user data identification device 2 comprises also connecting means 8 for connecting a user data identification module 9 to the user data identification device 2. Said connecting means 8 are arranged in a data transmission connection with the control unit 6 via a second control and data bus 10. By means of this second control and data bus 10, the control unit 6 can, if necessary, read data from and write data in the user data identification module 9.

The user data identification module 9 can also contain a control unit, connecting means and a memory, but these are not presented in the appended drawings and they are prior art known to anyone skilled in the field. Furthermore, the user data identification module 9 typically comprises means (not shown) for preventing unauthorized modification of information contained in the user data identification module 9. The user data identification module 9 can also be implemented in connection with the present invention in such a way that it is arranged e.g. in connection with the memory means MEM of the control unit 6 in such a way the data stored therein are non-erasable also when the operating voltages are not coupled to the user data identification device 2. In addition, these identification data are protected from unauthorized modification in a known manner e.g. with program codes formed in the application software of the control unit 6. However, the embodiment in which the user data identification module 9 is a separate card or the like has the advantage that in connection with the user data identification device 2 of the invention it is possible to use already existing user data identification modules 9, such as SIM cards.

In this preferred embodiment, the wireless communication device 1 comprises a control unit 11 for controlling the functions of the wireless communication device 1. This control unit 11 is arranged in a data transmission connection with the communication means 5 of the wireless communication device via a control and data bus 12. The wireless communication device 1 also comprises a radio part 13 e.g. for implementing mobile station functions. The structure and operation of this radio part 13 is prior art known to anyone skilled in the art, wherein its more detailed discussion is not necessary in this context. Moreover, the wireless communication device 1 can comprise connecting means 14 of the user data identification module, known as such, for connecting the user data identification module 9 to the wireless communication device 1. Thus, in the operation of the wireless communication device 1, it is possible in the user identification to use either the user data identification module 9 connected to the identification module connecting means 14 of the wireless communication device 1, or the user data identification device 2 according to the invention.

The following is a description on the operation of the method according to the first embodiment of the invention in a device according to FIG. 1. Let us assume that the user has coupled the operating voltages to the user data identification device 2, wherein the control unit 6 of the user data identification device has taken the necessary initialization steps to start up the operation of the user data identification device 2. At this point, preferably at least the receiver of the communication means 4 has been started to receive signals of the local area link 3. In addition, the control unit 6 has read data from the identification module 9 and stored the read data in memory means MEM. If there is only one transmission channel available for the local area link 3, the control unit 6 of the identification device sets the receiver 4a of the identification device to receive on the channel frequency of this transmission channel. However, if the local area link 3 is implemented in such a way that there are at least two transmission channels allocated for data transmission, the identification device 2 preferably performs scanning of the transmission channels at intervals, to find out a possible need for receiving messages.

At the stage when the user starts up the wireless communication device 1, the control unit 11 of the wireless communication device 1 performs the necessary initialization steps to start up the operation of the wireless communication device 1. In connection with these initialization steps, the control unit 11 e.g. tries to set up a data transmission connection via a wireless local area link 3 to the identification device 2. The control unit 11 generates e.g. an inquiry message or the like, whereby the wireless communication device 1 informs the identification device 2 about the fact that there is a need in the wireless communication device 1 to find out the user data. The control unit 11 transmits the inquiry message to the communication means 5. To transmit the inquiry message, the control unit examines, if necessary, if there is a vacant transmission channel in the frequency range allocated for transmission of messages. When using radio-frequency communication, this can be performed preferably in such a way that the control unit 11 switches the receiver 5a to receive at a channel frequency of the transmission channel. If a signal transmitted by another device can be detected on the channel frequency in question, the control unit can, for example, set the receiver to receive at another channel frequency, if possible. If no vacant transmission channel can be found, the control unit preferably waits for a moment and examines the channel frequencies again.

At the stage when a vacant transmission channel is found, the control unit 11 transmits an inquiry message in the local area link 3. This is performed preferably in the following way. The control unit 11 turns the transmitter 5b on, wherein the transmitter is set to transmit on the channel frequency of the detected free transmission channel. The transmitter 5b takes the necessary modulation steps to generate a radio signal and to transmit it to the local area link antenna 5c. If necessary, the signal to be transmitted can contain an initial synchronizing part before the actual information part, wherein the receiver 4a of the identification device 2 can be set to receive on the correct transmission channel before the information part is transmitted.

The transmitted signal is received in the antenna 4c of the communication means of the identification device and transferred to the receiver 4a of the communication means 4 of the identification device. In the receiver 4a of the communication means 4 of the identification device, the received radio-frequency signal is demodulated, and the inquiry message is transferred via the control and data bus 7 to the control unit 6 of the identification device. The control unit 6 of the identification device examines the received inquiry message and performs the steps required therein. In this case, the inquiry message is a message for inquiring the user data, wherein the control unit 6 produces a reply message to be transmitted via the local area link 3 to the wireless communication device 3. In this message transmission, it is possible to apply the procedures presented above in connection with the transmission of the inquiry message. The reply message for transmitting the user data read from the identification module 9 is transferred to the transmitter 4b of the communication means 4. If necessary, the control unit 6 switches the transmitter 4b on and sets it to transmit on a vacant transmission channel. This transmission channel is e.g. the same channel on which the inquiry message was transmitted. The transmitter 4b of the communication means 4 modulates the reply message to generate a radio-frequency signal and to transmit it to the communication means 5 of the wireless communication device 1. The receiver 5a of the communication means 5 demodulates the received radio-frequency signal, wherein the reply message can be transferred to the control unit 11 to be examined. The control unit 11 detects that the received message is a reply message received for the user data inquiry message, wherein the control unit 11 finds out the received user data from this reply message. After this, these user data can be used for user identification e.g. in wireless communication devices of prior art. At this stage, the wireless communication device 1 can e.g. generate a notice on a display (not shown) in which the user is requested to enter his/her own personal identification number (PIN).

If the communication resources of the local area link 3 are not available for the transmission of the inquiry message (e.g. all the transmission channels are busy), it is possible to try retransmission as long as resources become available, or e.g. until a possible predetermined waiting time expires. Thus, the user of the wireless communication device 1 can be informed about failure to examine the user identification data.

In the case that the identification device 2 is not equipped with an identification module 9, the identification device 2 informs about this in the reply message to the wireless communication device 1. Also in such a case that the data of the identification module 9 connected to the identification device 2 is not readable, this can be reported to the wireless communication device 1.

If the user data cannot be read from the identification device 2, it is possible to proceed e.g. in the following way. The control unit 11 of the wireless communication device 1 examines whether the user data identification module 9 is connected to the identification module connecting means 14 in the electronic device 1. If the identification module 9 is connected, the control unit 11 retrieves the user data from this identification module 9, after which the operation can proceed in the normal way.

In a situation in which the user data cannot be read from the identification device 2 and the identification module 9 is not connected to the identification module connecting means 14 or the data is not readable, the control unit 11 prevents the use of the wireless communication device 11 except for possibly such function in which no user data identification is necessary, such as making an emergency call.

In the above described method, the first step was to examine data transmitted by the identification device 2 and the next step to examine data of the identification module 9 possibly connected to the identification module connecting means 14 in the wireless communication device 1; however, it is also possible to apply the invention in such a way that the first step is to examine the user data by means of the identification module connecting means 14 of the wireless communication device 1. Thus, if no identification module is connected to the connecting means 14, it is examined whether the identification module 9 is connected to the identification device 2, where an attempt is then made to retrieve the user data.

Figure 2:
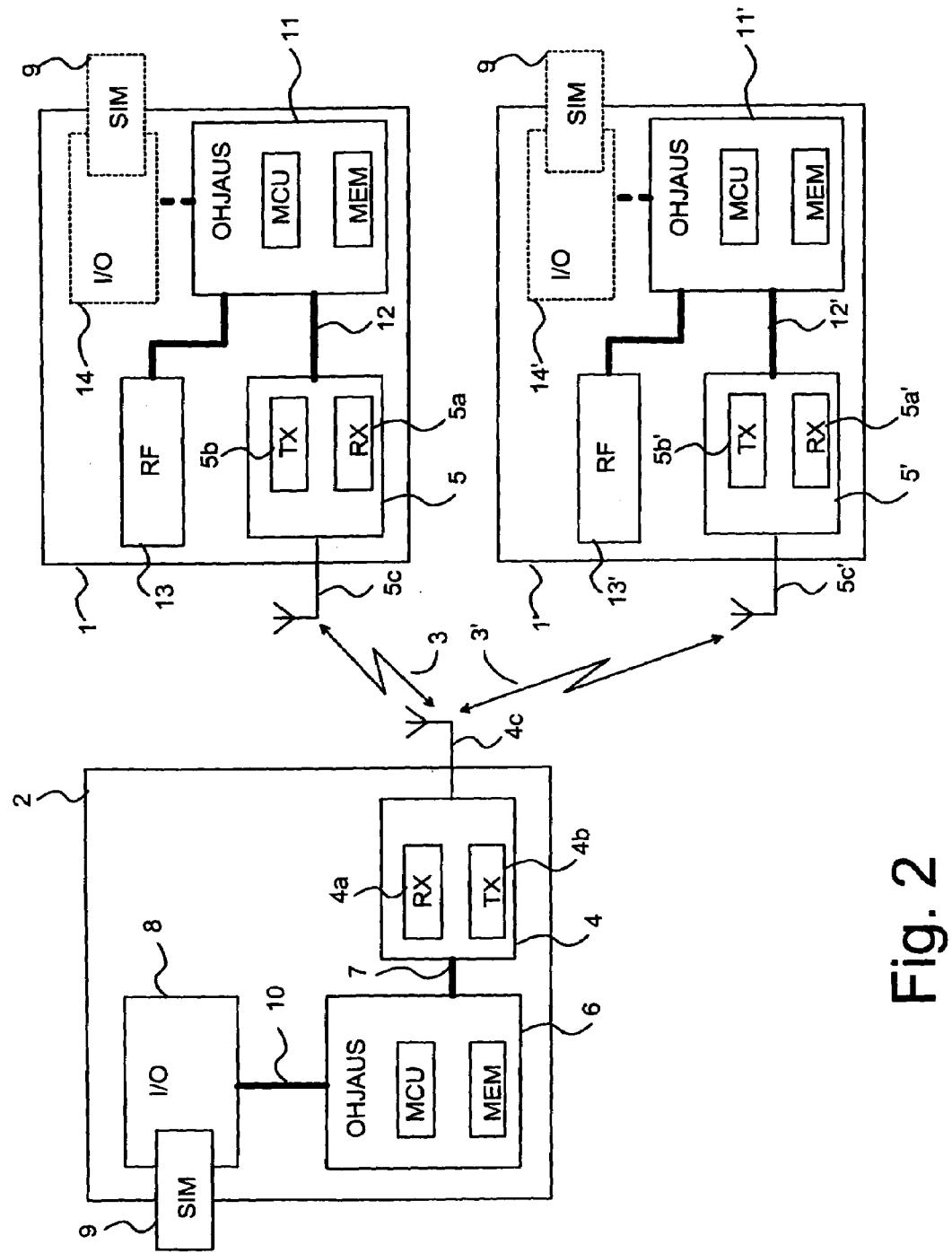
FIG. 2 shows a situation in which two wireless communication devices share one identification module.

FIG. 2 shows a situation in which the user has two wireless communication devices 1, 1', both of which utilize user data transmitted by the user data identification device 2. In FIG. 2, the first wireless communication device is indicated with the reference number 1, and the second wireless communication device is indicated with the reference number 1', accordingly. The wireless communication devices 1, 1' of FIG. 2 comprise substantially similar blocks, wherein the blocks of the first wireless communication device 1 corresponding to those of the second wireless communication device 1' are indicated with corresponding reference numbers. It is obvious that these wireless communication devices 1, 1' are not necessarily identical, but for example the first wireless communication device 1 can be a mobile station complying with the GSM system and the second wireless communication device 1' can be e.g. a mobile station complying with the UMTS system, a portable computer, etc. The first wireless communication device 1 and the second wireless communication device 1' can determine the user data contained in the identification module 9 connected to the identification device 2 substantially irrespective of each other. In this determination of the user data, it is possible to apply the procedure presented in connection with the method according to the first preferred embodiment of the invention as described above. If necessary, each wireless communication device 1, 1' can preferably supplement the inquiry message with identification data of the wireless communication device 1, 1' that transmitted the inquiry message, wherein the identification device 2 returns this identification data in the reply message. Thus, the wireless communication device 1, 1' that transmitted the inquiry message examines in more detail only such reply messages in which the identification data matches that defined for the respective wireless communication device 1, 1'. In this way, several wireless communication devices 1 can be used in connection with the same user data identification device 2 and the user data can still be checked from each wireless communication device 1, 1'.

Using the method of the invention, it is thus possible to implement e.g. a function similar to the so-called class A in the GPRS (General Packet Radio Service) system, in which the user must have a chance to set up a high speed circuit switched data connection and a packet switched (GPRS) connection simultaneously. Thus, e.g. the first wireless communication device 1 is a GSM mobile station, in which this high speed circuit switched data connection can be implemented, and the second wireless communication device 1' is a GSM mobile station in which the GPRS connection can be implemented.

Figure 3:
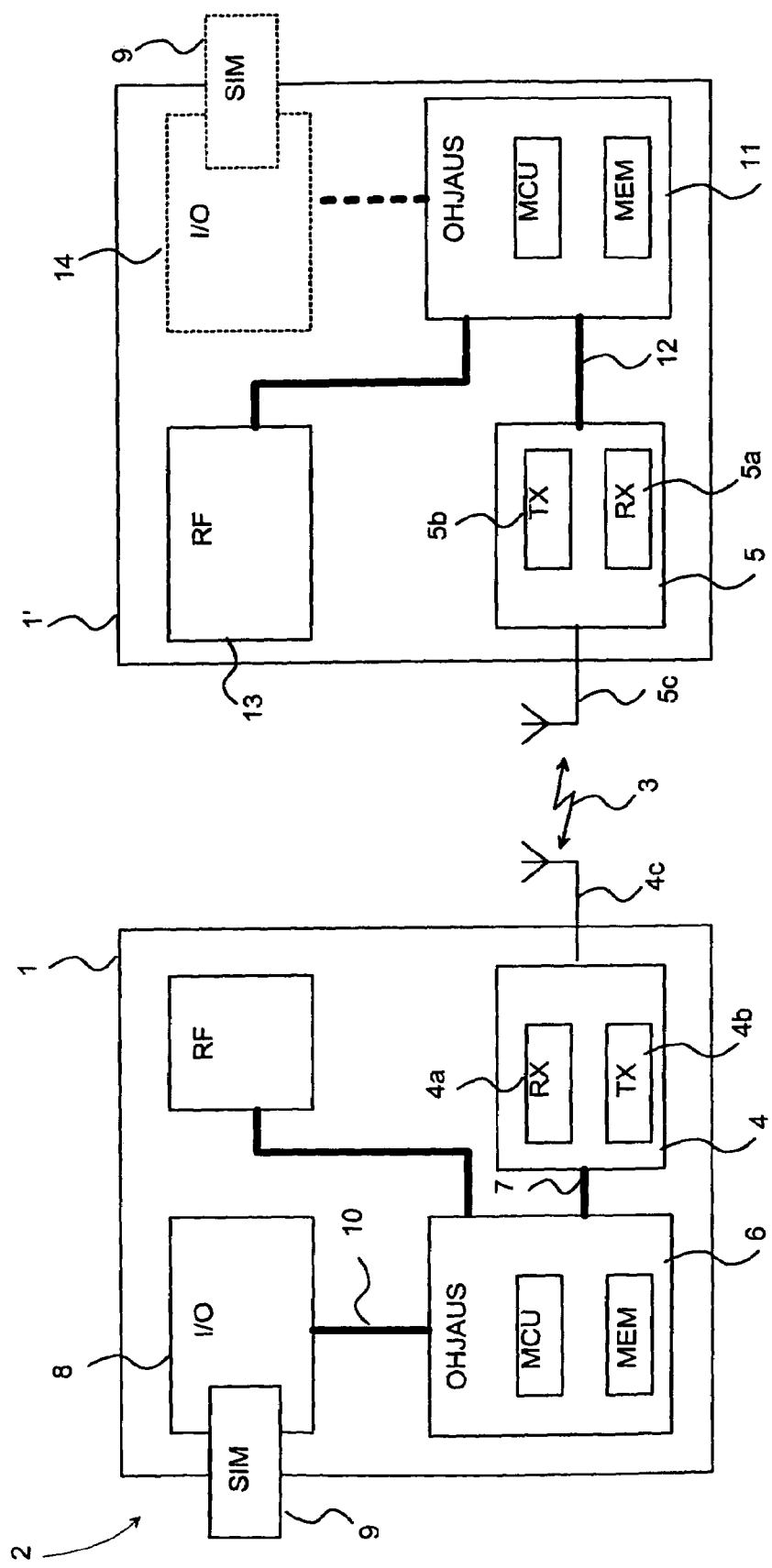
FIG. 3 shows a second preferred embodiment of the invention in which the identification module is arranged in the first mobile station.

FIG. 3 shows a second preferred embodiment of the invention, in which the user data identification device 2 is integrated in the wireless communication device 1. Thus, the wireless communication device 1 can find out the user data in a way known as such by means of a user data identification module 9 connected to the wireless communication device 1. In this embodiment, the second wireless communication device 1' can find out the user data from this identification device 2 arranged in the first wireless communication device 1. In this embodiment, in the identification of the user data for the second wireless communication device 1', it is possible to apply the procedures corresponding to those presented above in the description of the method according to the first preferred embodiment of the invention. Furthermore, the second wireless communication device 1' can also in this embodiment comprise connecting means 14 for connecting the identification module 9, wherein the second wireless communication device 1' can determine the user data even externally via the local area link 3 or internally via the connecting means 14.

In wireless communication devices 1, 1', in the identification of which user data can be performed either internally or externally, preferably either alternative can be selected as the default one, or the user can first be asked where the user data are to be found out.

In such embodiments in which the user data identification device 2 according to the invention is implemented as a separate device, it comprises a power supply of its own (not shown). A user data identification device 2 implemented in connection with the wireless communication device 1 can use the power supply of the wireless communication device 1 (not shown).

Furthermore, the practical implementation of the user data identification device 2 can be e.g. a device arranged to be attached to a wrist. Thus the user wears the identification device 2 on his/her wrist, wherein the identification device 2 can be easily carried along. It is obvious that also other types of practical solutions are feasible.

The user data identification device 2 according to the invention can also be applied to prevent unauthorized use of the wireless communication device 1. This can be achieved in such a way that when started up, the wireless communication device 1 examines the user data from the identification device 2. If the identification device 2 is out of the operating range of the communication means 5 of the local area link of the wireless communication device 1, the wireless communication device 1 receives no reply to the user data reply, wherein the user of the wireless communication device can be prevented. In this embodiment, the wireless communication device 1 is provided with at least communication means 5 and a control unit 11. In the implementation of the communication means 5 and the control unit 11, it is possible to use also possible corresponding functional blocks of the wireless communication device 1.

The communication means 5 of the wireless communication device 1, 1' can also be used for other communication, such as e.g. in connection with a wireless local area network (WLAN). Thus, in the implementation of the message structure, it may be necessary to use various identification methods, whereby the messages to be used for the wireless local area network and for user data identification are distinguished from each other. This implementation is applicable for anyone skilled in the art on the basis of the above description of the invention, and its more detailed discussion is not necessary in this context.

Furthermore, the invention has the advantage that the wireless communication device 1 does not necessarily require connecting means 14 for connecting the identification module 9. Also, in the design of the structure of the wireless communication device 1 it is not necessary to consider the space requirement for these connecting means 14 and the identification module 19, wherein the size of the wireless communication device 1 can be considerably reduced.

It is obvious that in practical implementations e.g. the mechanisms for message transmission be different from the embodiments presented above.

The present invention is not limited solely to the embodiments presented above, but it can be modified within the scope of the appended claims.

What is claimed is:

1. A method for transmitting user identification data to a wireless communication device (1), in which method said user data are stored in a user data identification module (2), wherein in connection with starting up of the wireless communication device (1), the user data stored in said user data identification module (2) are examined to find out the access rights of the user of the wireless communication device (1), wherein the user identification data are transmitted at least partly in a wireless manner from the user data identification module (2) to the wireless communication device (1).

2. The method according to claim 1, wherein the user data stored in said user data identification module (2) are used in connection with at least a first (1) and a second wireless communication device (1') to find out the access rights of the user.

3. The method according to claim 2, wherein the identification module (2) is placed in the first wireless communication device (1), wherein to find out the access rights of the user, the identification module (2) placed in said first wireless communication device (1) is used in the second wireless communication device (1').

4. The method according to claim 1, wherein for the transmission of user data, radio-frequency signals are used.

5. The method according to claim 1, further comprising a step of providing user identification data by inserting a SIM card in said user data identification module (2).

6. A user data identification module which comprises means for storing user identification data and means for transmission of user data to a wireless communication device, the wireless communication device comprising means for receiving user data and start up means for the wireless communication device, the start up means further comprising means for examining the user data to find out during a start up mode of the wireles communications device the access rights of the user of the wireless communication device, wherein said means for transmitting user identification data comprise wireless communication means, wherein the user data is checked in the wireless communication device to determine if the user has access rights to the wireless communication device.

7. The user data identification module (2) according to claim 6, wherein it is intended to be used in connection with at least a first wireless communication device (1) and a second wireless communication device (1') to find out the access rights of the user.

8. The user data identification module (2) according to claim 6, wherein the means (4) for transmitting user data comprise means (RX, TX) for transmitting and receiving low power radio frequency signals.

9. The user data identification module (2) according to claim 6, wherein it is arranged to be portable with the user, preferably to be attached to the wrist.

10. The user data identification module according to claim 6, wherein said user data identification module (2) is operative with a SIM card.

11. A user data identification module (2) which comprises means (9) for storing user identification data and means (4, 6) for transmission of user data to a wireless communication device (1), the wireless communication device (1) comprising means (5) for receiving user data and means (11) for examining the user data to find out the access rights of the user of the wireless communication device (1), wherein said means (4) for transmitting user identification data comprise wireless communication means; wherein it is intended to be used in connection with at least a first wireless communication device (1) and a second wireless communication device (1') to find out the access rights of the user; and it is placed in the first wireless communication device (1), and wherein said identification module (2) placed in the first wireless communication device (1) is arranged to be used for finding out the access rights of the user in the second wireless communication device (1').

12. A wireless communication device which comprises means for receiving user identification data stored in a user data identification module and in a start up mode of the wireless communication device means for examining the user data to find out the access rights of the user of the wireless communication device, wherein said means for receiving user identification data comprise wireless communication means, wherein the user data is checked in the wireless communication device to determine if the user has access rights to the wireless communication device.

13. The wireless communication device (1) according to claim 12, wherein it is a GSM mobile station.

14. The wireless communication device (1) according to claim 12, wherein it comprises means (11) for setting the access rights for the wireless communication device, wherein the access rights (1) for the wireless communication device (1) are arranged to be limited, if the user data are not received from the identification module (2) in the wireless communication device (1).

15. The wireless communication device of claim 12 further comprising start up means for the wireless communication device, the start up means including the start up mode during which the means for examining the user data determines the access rights of the user of the wireless communication device.

16. A method for transmitting user identification data to a wireless communication device, comprising the steps of:
  storing user identification data within a user data identification module, the user identification data including access rights of the user for communication within a mobile communication system;
  communicating by the wireless communication device via a first portion of the electromagnetic spectrum to a mobile communication system;
  interrogating the user data identification module by the wireless communication device via a second portion of the electromagnetic spectrum to attain a transmitting of the user identification data from the data identification module to the wireless communication device, the second spectral portion being different from said first spectral portion; and
  transmitting the user identification data via the second spectral portion, at least partly in a wireless manner, from the user data identification module to the wireless communication device.

* * * * *